United States Patent
Choi et al.

(10) Patent No.: US 9,150,783 B2
(45) Date of Patent: Oct. 6, 2015

(54) ORGANIC LIGHT EMITTING DIODE INCLUDING ORGANIC LAYER COMPRISING ORGANIC METAL COMPLEX

(75) Inventors: Kyung-Hoon Choi, Suwon-si (KR); Kwan-Hee Lee, Suwon-si (KR); Min-Seung Chun, Suwon-si (KR); Choon-Woo Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1355 days.

(21) Appl. No.: 11/735,419

(22) Filed: Apr. 13, 2007

(65) Prior Publication Data
US 2008/0111476 A1  May 15, 2008

(30) Foreign Application Priority Data

Nov. 9, 2006 (KR) .................. 10-2006-0110534
Feb. 22, 2007 (KR) .................. 10-2007-0018089

(51) Int. Cl.
H01L 29/00 (2006.01)
C09K 11/06 (2006.01)
H05B 33/14 (2006.01)

(52) U.S. Cl.
CPC ............. *C09K 11/06* (2013.01); *H05B 33/14* (2013.01); *C09K 2211/1007* (2013.01); *C09K 2211/1011* (2013.01); *C09K 2211/1029* (2013.01); *C09K 2211/1033* (2013.01); *C09K 2211/1037* (2013.01); *C09K 2211/187* (2013.01); *C09K 2211/188* (2013.01)

(58) Field of Classification Search
USPC ........... 257/40, E51; 428/690, 17; 528/9, 395
See application file for complete search history.

(56) References Cited

U.S. PATENT DOCUMENTS

| 6,489,638 | B2 | 12/2002 | Seo et al. | |
|---|---|---|---|---|
| 7,247,761 | B2* | 7/2007 | Falcou et al. | 585/427 |
| 2004/0002970 | A1 | 1/2004 | Hur | |
| 2004/0146746 | A1 | 7/2004 | Lee et al. | |
| 2005/0058283 | A1 | 3/2005 | Seo | |
| 2005/0191927 | A1* | 9/2005 | Gambogi et al. | 445/24 |
| 2006/0058524 | A1* | 3/2006 | Falcou et al. | 544/294 |
| 2007/0009759 | A1* | 1/2007 | Burn et al. | 428/690 |

FOREIGN PATENT DOCUMENTS

| JP | 9-165390 A | 6/1997 |
|---|---|---|
| JP | 9-165391 A | 6/1997 |

(Continued)

OTHER PUBLICATIONS

Sapochak et al. Journal of Physical Chemistry B (2004), 108 925), 8558-8566. ( enclosed at the end of Office Action—Non Final Rejection).*

(Continued)

*Primary Examiner* — Nathan Ha
(74) *Attorney, Agent, or Firm* — Christie, Parker & Hale, LLP

(57) ABSTRACT

Organic light emitting diodes (OLEds) are provided. In one embodiment, an OLED includes a first electrode, a second electrode and an organic layer positioned between the first and second electrodes. The organic layer comprises an organic metal complex represented by the formula $[M(L)_2]_a$, in which L is an anionic ligand, M is a metal that can be five-coordinated or six-coordinated with L, and a is an integer ranging from 2 to 4.

15 Claims, 8 Drawing Sheets

(56) References Cited

FOREIGN PATENT DOCUMENTS

| | | |
|---|---|---|
| JP | 10-45722 | 2/1998 |
| JP | 2000-247972 A | 9/2000 |
| JP | 2001-131162 A | 5/2001 |
| JP | 2008-103535 A | 5/2008 |
| KR | 2005-0078472 | 8/2005 |
| KR | 2006-0059323 | 6/2006 |
| WO | WO 02/43447 A2 | 5/2002 |

OTHER PUBLICATIONS

Patent Abstracts of Japan, Publication No. 10-045722, dated Feb. 17, 1998, in the name of Noriyuki Kishii et al.
European Search Report dated Sep. 18, 2007, for EP 07109290.2, in the name of Samsung SDI Co., Ltd.
Chihaya Adachi, et al., Appl. Phys. Left., 79, 2082-2084 (2001) (On Order).
Linda S. Sapochak, et al., "Supramolecular Structures of Zinc (II) (8-Quinolinolato) Chelates," *J. Phys. Chem. B*, pp. 8558-8566, vol. 108, No. 25, 2004, Published on the Web Mar. 18, 2004, American Chemical Society.
Linda S. Sapochak, et al., "Electroluminescent Zinc(II) Bis(8-hydroxyquinoline): Structural Effects on Electronic States and Device Performance," *J. Am. Chem. Soc*, vol. 124, No. 21, .2002, 6116-6125, JACS Articles, Published on the Web May 3, 2002, American Chemical Society.
Gul Yu, et al., "Structures, Electronic States, and Electroluninescent Properties of a Zinc(II) 2-(2-Hydroxyphenyl)benzothiazolate Complex," *J. Am. Chem. Soc.*, vol. 125, No. 48, 2003, 14816-14824, JACS Articles, Published on the Web Nov. 7, 2003, American Chemical Society.
Japanese Office action dated Mar. 3, 2009 in corresponding Japanese Patent Application No. 2007-085556, noting references listed in this IDS.

* cited by examiner

ORGANIC LIGHT EMITTING DIODE INCLUDING ORGANIC LAYER COMPRISING ORGANIC METAL COMPLEX

CROSS-REFERENCE TO RELATED PATENT APPLICATION

This application claims priority to and the benefit of Korean Patent Application No. 10-2006-0110534 filed on Nov. 9, 2006, and Korean Patent Application No. 10-2007-0018089 filed on Feb. 22, 2007, each filed in the Korean Intellectual Property Office, the entire contents of which are incorporated herein by reference.

BACKGROUND OF THE INVENTION

1. Field of the Invention

The present invention relates to organic light emitting diodes including organic layers comprising organic metal complexes. More particularly, the invention is directed to organic light emitting diodes including organic layers comprising oligomer type organic metal complexes.

2. Description of the Related Art

Organic light emitting diodes (OLEDs) are self-emissive light-emitting devices. OLEDs have wide viewing angles, good contrast and quick response time, and implement full color images.

In a conventional organic light emitting diode, an anode is formed on a substrate. A hole transport layer, an emissive layer, an electron transport layer and a cathode are sequentially formed on the anode. When a current is applied to the anode and the cathode, electrons injected from the cathode migrate to the emissive layer via the electron transport layer. The electrons are recombined in the emissive layer with holes injected from the anode to generate excitons. When the excitons drop from an excited state to a ground state, light is emitted from the emissive layer, thereby forming an image. An exciton can be in one of two states: singlet or triplet. The light that is emitted when excitons drop to the ground state from a singlet excitation state is referred to as "fluorescence." The light that is emitted when excitons drop to the ground state from a triplet excitation state is referred to as "phosphorescence." Fluorescence having a 25% probability of a singlet excitation state (triplet excitation state: 75%) has low luminous efficiency, whereas phosphorescence having a 25% probability of a singlet excitation state and a 75% probability of a triplet excitation state can theoretically have an internal quantum efficiency of about 100%. However, in conventional organic light emitting diodes, it is difficult to obtain satisfactory electrical properties.

SUMMARY OF THE INVENTION

In one embodiment of the present invention, an organic light emitting diode includes an organic layer comprising an oligomer type organic metal complex.

According to an embodiment of the present invention, an organic light emitting diode includes a first electrode, a second electrode and an organic layer positioned between the first electrode and the second electrode. In one embodiment, the organic layer is formed of an organic metal complex represented by Formula 1 below.

  Formula (1)

In Formula 1, L is an anionic ligand, M is a metal that can be five-coordinated or six-coordinated with L, and a is an integer ranging from 2-4.

An organic light emitting diode according to one embodiment of the present invention that includes the organic layer formed of an organic metal complex represented by Formula 1 as described above has good electrical properties.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
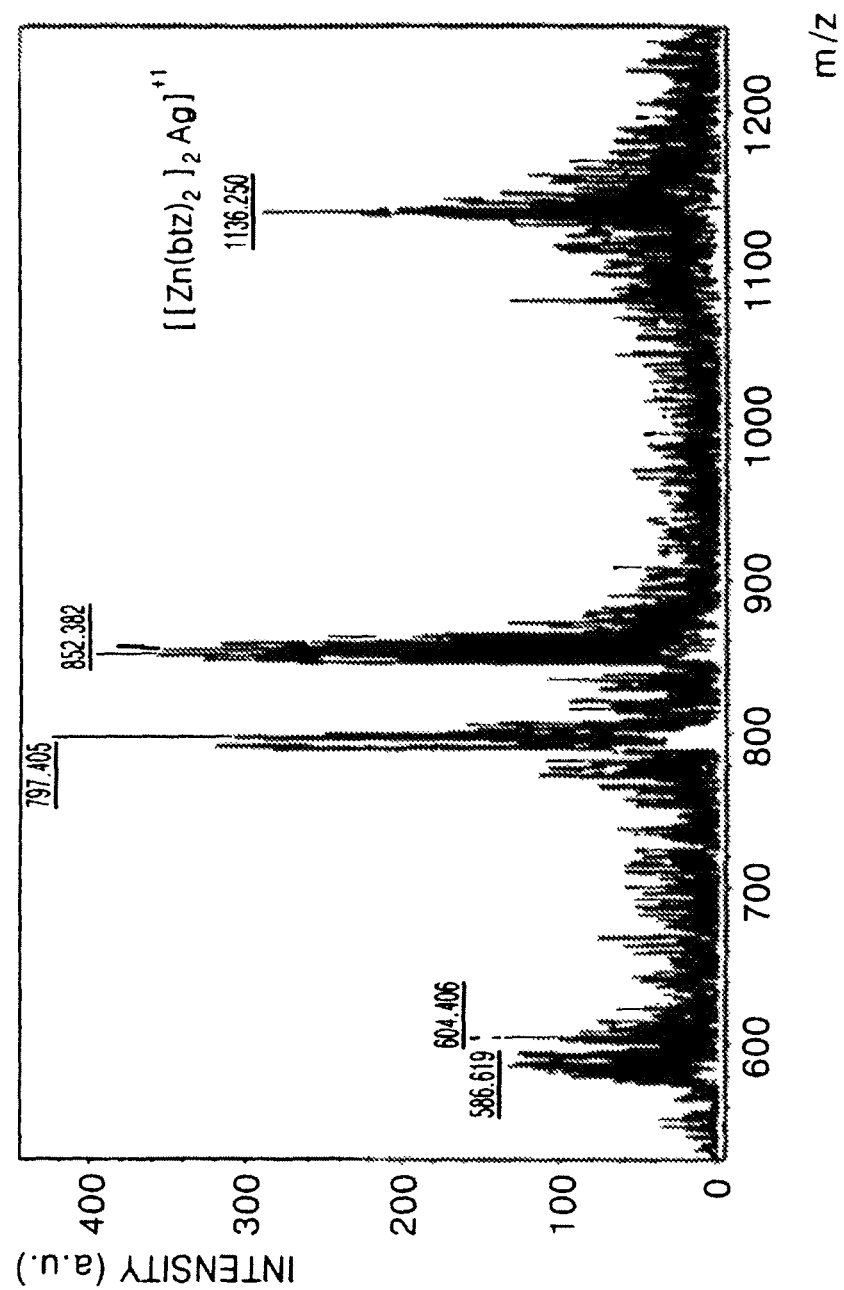
FIG. 1 is a graph illustrating mass analysis data of an organic metal complex according to one embodiment of the present invention.

According to one embodiment of the present invention, an organic light emitting diode includes an organic layer formed of an organic metal complex represented by Formula 1 below.

  Formula (1)

In Formula 1, M is a core metal, L is a ligand coordinated with the core metal M, and a is an integer ranging from 2-4. Since the organic metal complex is represented by Formula 1 in which a is an integer ranging from 2-4, the organic metal complex may be an oligomer, and not a monomer.

In Formula 1, M is a metal that can be five-coordinated or six-coordinated with L. Therefore, the organic metal complex of Formula 1 can be a type of oligomer having at least 2 core metals (M). The at least 2 core metals (M) can simultaneously bind one ligand. Nonlimiting examples of core metals (M) include Zn, Co, Ni, and Fe.

In Formula 1, L is an anionic ligand, and can be coordinated with at least one core metal M.

In one exemplary embodiment, L can be represented by Formula 2 or 3 below.

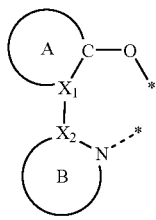

Formula (2)

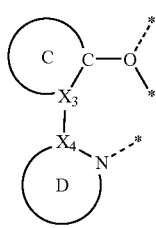

Formula (3)

In Formula 3, the ligand has a total of 3 binding sites, and can bind 2 core metals M (for example, refer to Formulae 4, 5, 6 and 7 below). Accordingly, an oligomer type organic metal complex as represented by Formula 1 can be obtained.

In Formulae 2 and 3, A, B, C and D may each independently be an aromatic ring or a heteroaromatic ring. In one embodiment, for example, A, B, C and D may each independently be an aromatic ring having 5-20 ring members or a heteroaromatic ring having 5-20 ring members.

Nonlimiting examples of suitable materials for A, B, C and D include benzene, pentalene, indene, naphthalene, azulene, heptalene, biphenylene, indacene, acenaphthylene, fluorene, phenalene, phenanthrene, anthracene, fluoranthene, triphenylene, pyrene, chrysene, naphthacene, picene, perylene, pentaphene, hecacene, pyrrole, imidazole, pyrazole, isothiazole, isoxazole, pyridine, pyrazine, pyrimidine, pyridazine, isoindole, indole, indazole, purine, quinoline, phthalazine, naphthyridine, quinoxaline, quinazoline, cinnoline, carbazole, phenanthridine, acridine, perimidine, phenanthroline, phenazine, phenothiazine, phenoxazine, benzothiazole, benzooxazole and benzoimidazole.

According to an embodiment of the present invention, A and C in Formulae 2 and 3 may each independently be benzene or naphthalene. Also, B and D may be selected from pyridine, benzothiazole, benzooxazole, quinoline and benzoimidazole.

In one embodiment of the present invention, A and B can be bound to each other in a variety of ways, for example, by a single bond as shown or by being fused with each other. Likewise, C and D can be bound to each other in a variety of ways, for example, by a single bond as shown or by being fused with each other.

Each of A, B, C and D may each independently have a substituent, nonlimiting examples of which include hydrogen atoms, halogen atoms, hydroxyl groups, cyano groups, substituted and unsubstituted $C_1$-$C_{30}$ alkyl groups, substituted and unsubstituted $C_1$-$C_{30}$ alkoxy groups, substituted and unsubstituted $C_1$-$C_{30}$ acyl groups, substituted and unsubstituted $C_2$-$C_{30}$ alkenyl groups, substituted and unsubstituted $C_2$-$C_{30}$ alkynyl groups, substituted and unsubstituted $C_6$-$C_{30}$ aralkyl groups, substituted and unsubstituted $C_6$-$C_{30}$ aryl groups, and substituted and unsubstituted $C_5$-$C_{30}$ heteroaryl groups.

In Formulae 2 and 3, $X_1$, $X_2$, $X_3$ and $X_4$ may each independently be C, N, O, S or P.

In Formulae 2 and 3, * is a site that binds M.

In one exemplary embodiment, a compound represented by Formula 1 can be represented by Formula 4, 5 or 6 below.

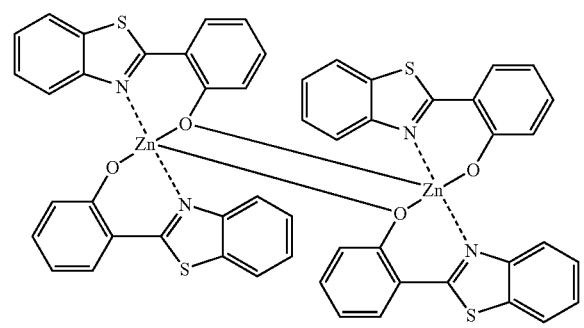

Formula (4)

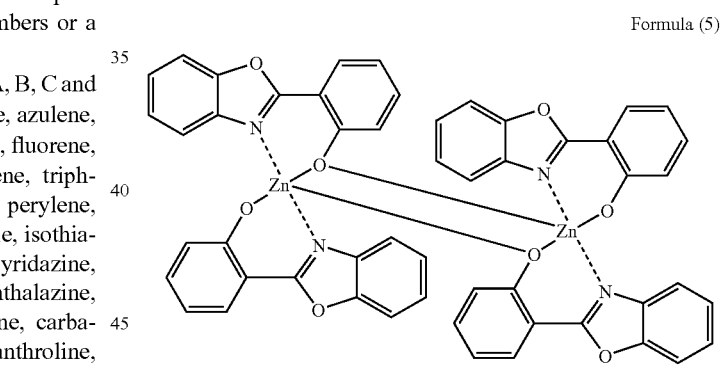

Formula (5)

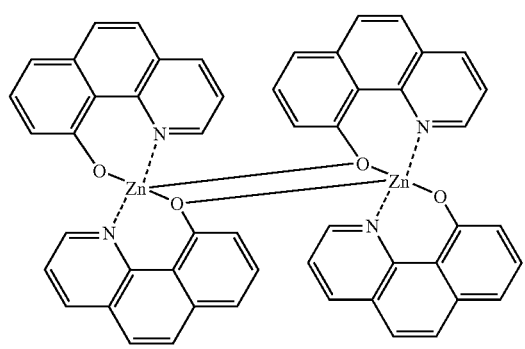

Formula (6)

FIG. 1 illustrates mass analysis data of an organic metal complex represented by Formula 4.

One exemplary compound satisfying Formula 1 can be represented by Formula 7 below.

Formula (7)

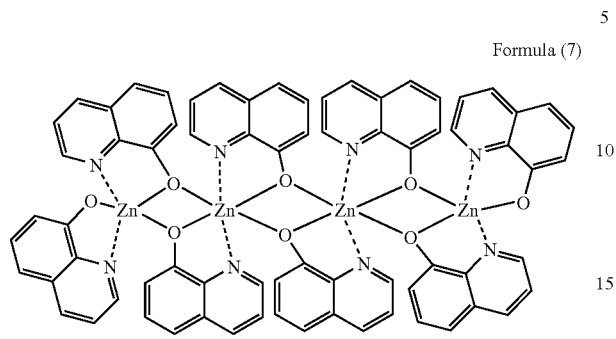

Figure 2:
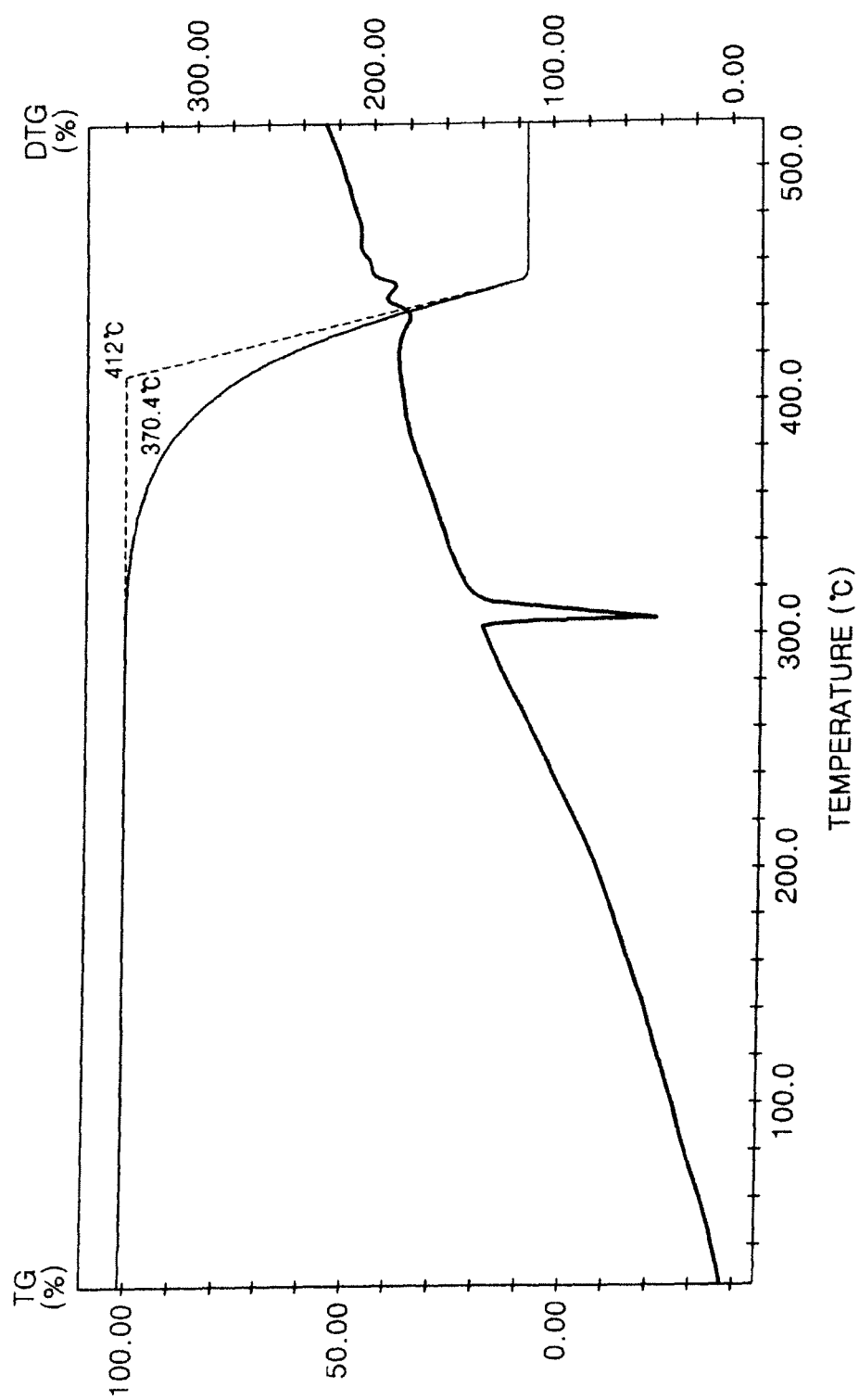
FIG. 2 is a graph illustrating Thermogravimetric Analysis (TGA) of an organic metal complex according to one embodiment of the present invention.
Figure 3:
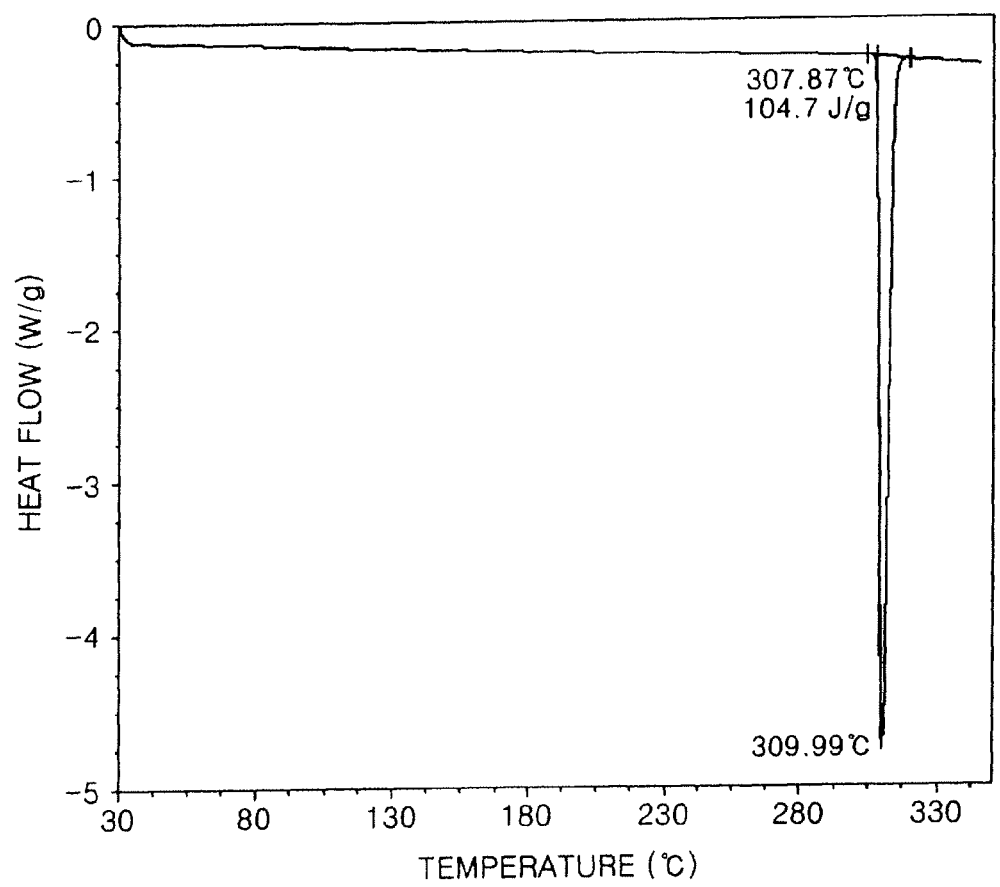
FIG. 3 is a graph of Digital Scanning Calorimetry (DSC) of an organic metal complex according to one embodiment of the present invention.

The organic metal complex described above has high thermal stability. For example, FIG. 2 is a graph of Thermogravimetric Analysis (TGA) of the organic metal complex of Formula 4, and FIG. 3 is a graph of Digital Scanning Calorimetry (DSC) of the organic metal complex of Formula 4. As shown in FIGS. 2 and 3, the organic metal complex according to one embodiment of the present invention has high thermal stability, and thus can be suitable for an organic layer of an organic light emitting diode.

An organic metal complex according to one embodiment of the present invention can be used in an organic layer of an organic light emitting diode, particularly as an emissive layer. Here, the emissive layer can further include a phosphorescent dopant, and the organic metal complex can be used as a host. The phosphorescent dopant is not particularly limited, and can be any known phosphorescent dopant. Nonlimiting examples of the phosphorescent dopant include organic metal complexes including Ir, Pt, Os, Re, Ti, Zr or Hf. In one embodiment, the phosphorescent dopant includes Ir or Pt. When an organic metal complex comprising 4-coordinate Pt is used as a phosphorescent dopant, an emissive layer can be formed at a relatively low deposition temperature. Thus, an organic light emitting diode having high efficiency and long lifetime can be highly mass-produced.

Nonlimiting examples of suitable phosphorescent dopants include bisthienylpyridine acetylacetonate Iridium, bis(benzothienylpyridine)acetylacetonate Iridium, Bis(2-phenyl-benzothiazole)acetylacetonate Iridium, bis(1-phenylisoquinoline) Iridium acetylacetonate, tris(1-phenylisoquinoline) Iridium, tris(phenylpyridine) Iridium, tris(2-biphenyl pyridine) Iridium, tris(3-biphenyl pyridine) Iridium, tris(4-biphenyl pyridine) Iridium, Ir(pq)$_2$(acac) represented by Formula 8 below where pq is 2-phenylquinoline and acac is acetylacetone, Ir(ppy)$_3$ represented by Formula 9 below where ppy is phenyl pyridine, platinum(II)octaethylporphyrin (PtOEP), compounds represented by Formula 10 below, Firpic represented by Formula 11 below, Ir(piq)$_3$ represented by Formula 12 below, Ir(piq)$_2$acac represented by Formula 13 below where piq is phenylisoquinoline, compounds represented by Formula 14 below, compounds represented by Formula 15 below, compounds represented by Formula 16 below, compounds represented by Formula 17 below and combinations thereof.

Formula (8)

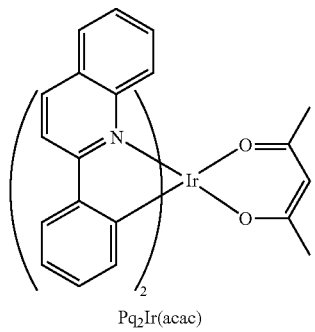

Pq$_2$Ir(acac)

Formula (9)

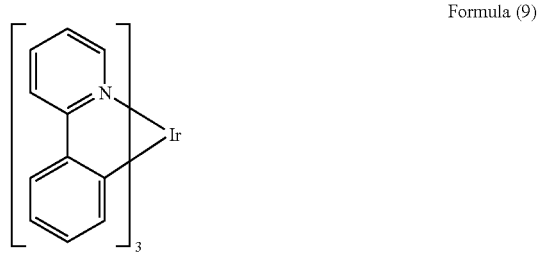

Formula (10)

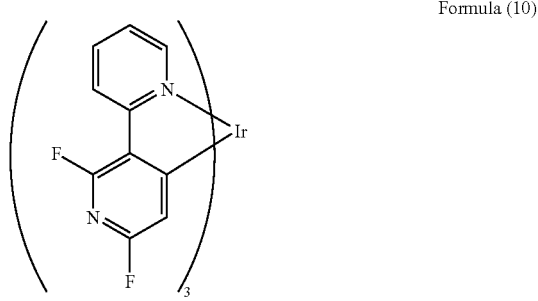

Formula (11)

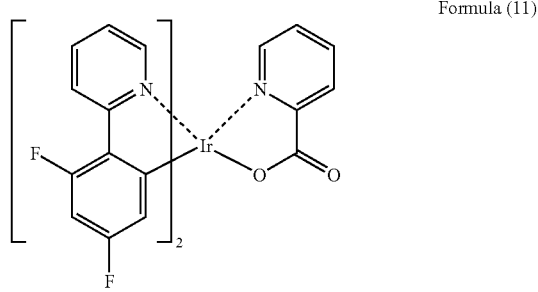

Formula (12)

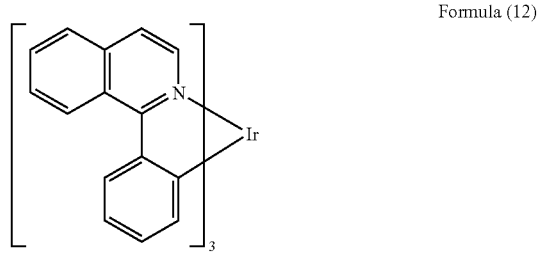

Formula (13)

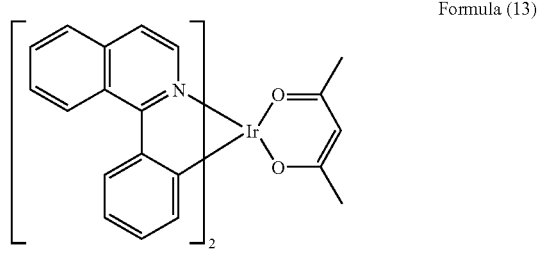

Formula (14)
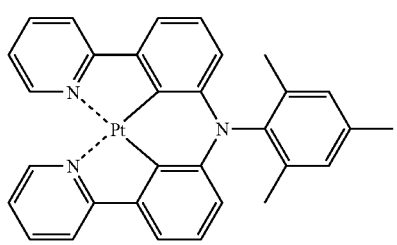

Formula (15)
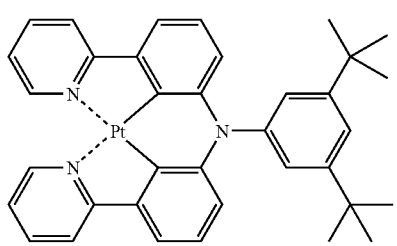

Formula (16)
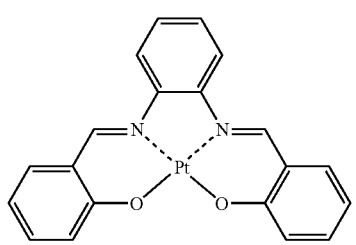

Formula (17)
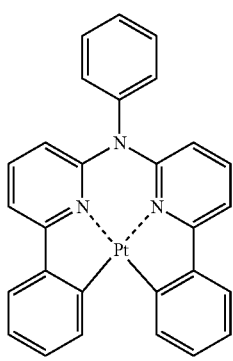

When the organic metal complex according to one embodiment of the present invention acts as a host by being used with the phosphorescent dopant, the emissive layer of the organic light emitting diode can further include a second host. Nonlimiting examples of suitable second hosts include CBP(4,4-N,N-dicarbazole-biphenyl), Alq3(Aluminum tris(8-hydroxyquinoline)), BAlq and BeBq and combinations thereof.

The second host may be present in an amount ranging from about 50 to about 150 parts by weight based on 100 parts by weight of the organic metal complex. In one embodiment, the second host is present in an amount ranging from about 90 to about 110 parts by weight based on 100 parts by weight of the organic metal complex. When the amount of the second host is within this range, proper charge balance can be obtained.

According to another embodiment of the present invention, in addition to the emissive layer described above, the organic light emitting diode can further include a hole injection layer, a hole transport layer, an electron transport layer, an electron injection layer or a combination thereof. Although the organic metal complex according to one embodiment is used with a phosphorescent dopant (and optionally with a second host) for the emissive layer, the organic metal complex has good electron transport properties and therefore need not further include a hole blocking layer, which is used in conventional organic light emitting diodes. By not including a hole blocking layer, an organic light emitting diode having low driving voltage, high efficiency, good luminescence and long lifetime can be obtained.

Figure 4:
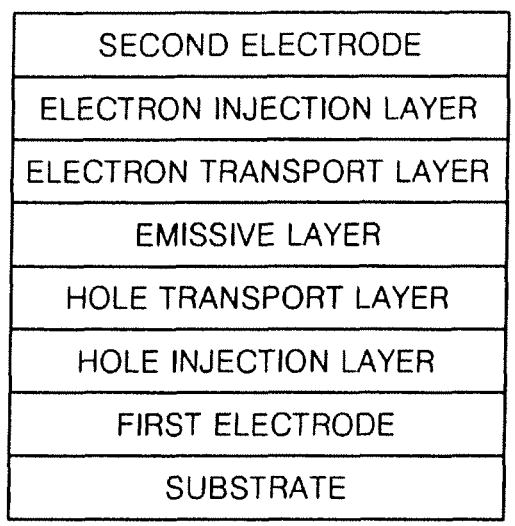
FIG. 4 is a cross-sectional view of an organic light emitting diode according to one embodiment of the present invention.

According to another embodiment of the present invention, a method of manufacturing an organic light emitting diode is provided. FIG. 4 is a cross-sectional view of an organic light emitting diode according to one embodiment of the present invention. Referring to FIG. 4, an organic light emitting diode according to one embodiment includes a substrate on which is formed a first electrode, a hole injection layer (HIL), a hole transport layer (HTL), an emissive layer (EML), an electron transport layer (ETL), an electron injection layer (EIL) and a second electrode.

The first electrode is first formed on the substrate. The substrate is any substrate used in conventional organic light emitting devices and may be a glass substrate or a plastic substrate having good transparency, surface smoothness, manageability and waterproofness. The first electrode can be a transparent electrode, a reflective layer or the like, formed of a high conductive metal such as Li, Mg, Al, Al—Li, Ca, Mg—In, Mg—Ag, Ca—Al, Al—ITO, ITO, IZO or the like.

Next, the hole injection layer (HIL) can be formed on the first electrode using various known methods such as vacuum deposition, spin coating, casting, the Langmuir Blodgett (LB) process, or the like.

When the HIL is formed by vacuum deposition, the vacuum deposition conditions may vary according to the compound used to form the HIL, and the desired structure and thermal properties of the HIL to be formed. In general, however, the vacuum deposition may be performed at a deposition temperature ranging from about 100° C. to about 500° C., a pressure ranging from about $10^{-8}$ to about $10^{-3}$ torr, and a deposition speed ranging from about 0.01 to about 100 Å/sec.

When the HIL is formed by spin coating, the coating conditions may vary according to the compound that is used to form the HIL, and the desired structure and thermal properties of the HIL to be formed. In general, however, the coating speed may range from about 2,000 to about 5,000 rpm, and the temperature for heat treatment (which is performed to remove a solvent after coating) may range from about 80 to about 200° C.

The HIL is not particularly limited and can be formed of any known hole injection material. Nonlimiting examples of suitable materials for use as the HIL include copper phthalocyanine (CuPc) and Starburst-type amines such as TCTA, m-MTDATA, IDE406 (fabricated by IDEMITZ), Polyaniline/Dodecylbenzenesulfonic acid (Pani/DBSA) and Poly(3,4-ethylenedioxythiophene)/Poly(4-styrenesulfonate (PEDOT/PSS) and the like.

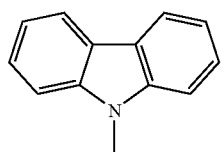
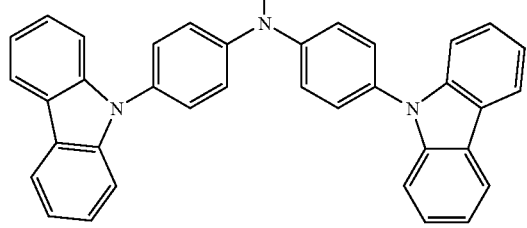

TCTA m-MTDATA

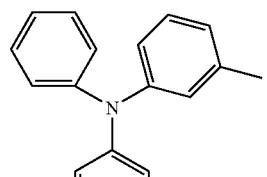
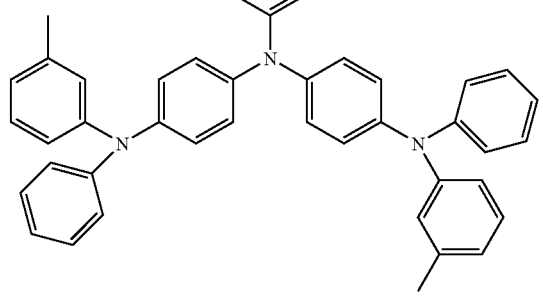
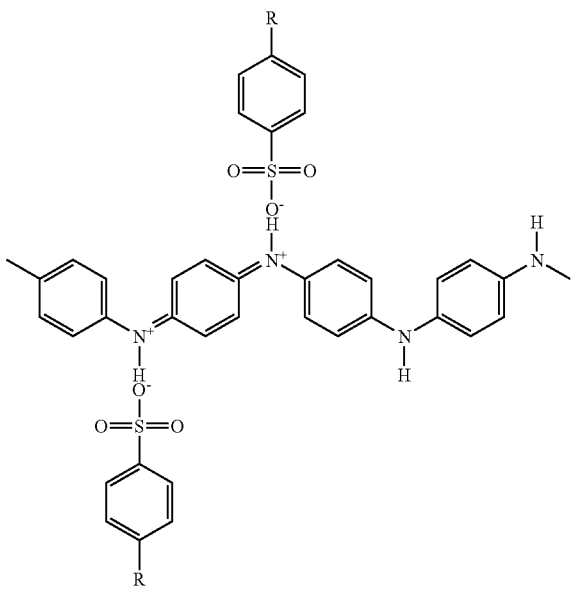

Pani/DBSA

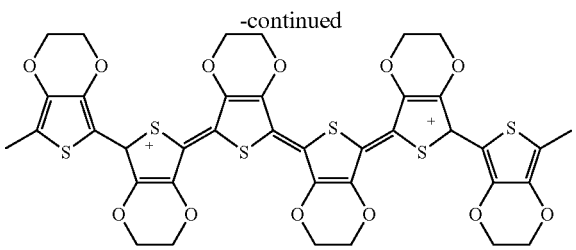

PEDOT/PSS

The thickness of the HIL may range from about 20 to about 200 nm. In one embodiment, for example, the thickness of the HIL ranges from about 40 to about 150 nm. When the thickness of the HIL is within these ranges, the HIL has excellent hole injecting abilities and excellent driving voltage properties.

Next, the hole transport layer (HTL) can be formed on the HIL by vacuum deposition, spin coating, casting, LB, or the like. When the HTL is formed by vacuum deposition or spin coating, the deposition and coating conditions are similar to those used for the formation of the HIL, although the deposition and coating conditions may vary according to the material that is used to form the HTL.

The HTL is not particularly limited and can be formed of any known hole transport material. Nonlimiting examples of suitable materials for use as the HTL include 1,3,5-tricarbazolylbenzene, 4,4'-biscarbazolylbiphenyl, polyvinylcarbazole, m-biscarbazolylphenyl, 4,4'-biscarbazolyl-2,2'-dimethylbiphenyl, 4,4',4''-tri(N-carbazolyl)triphenylamine, 1,3,5-tri(2-carbazolylphenyl)benzene, 1,3,5-tris(2-carbazolyl-5-methoxyphenyl)benzene, bis(4-carbazolylphenyl)silane, N,N'-bis(3-methylphenyl)-N,N'-diphenyl-[1,1-biphenyl]-4,4'-diamine (TPD), N,N'-di(naphthalene-1-yl)-N,N'-diphenyl benzidine (α-NPD), N,N'-diphenyl-N,N'-bis(1-naphthyl)-(1,1'-biphenyl)-4,4'-diamine (NPB), poly(9,9-dioctylfluorene-co-N-(4-butylphenyl)diphenylamine (TFB), poly(9,9-dioctylfluorene-co-bis-(4-butylphenyl-bis-N,N-phenyl-1,4-phenylenediamine (PFB) and the like.

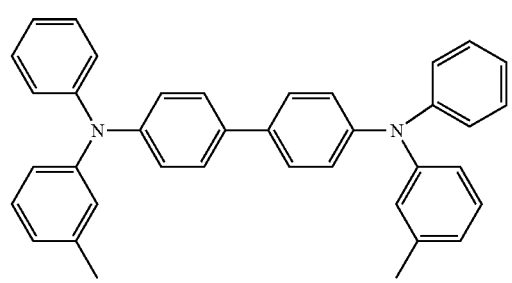

TPD

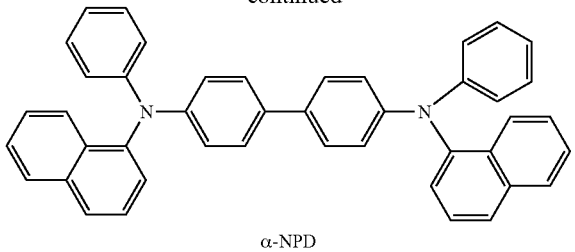

α-NPD

The thickness of the HTL may range from about 10 to about 100 nm. In one embodiment, for example, the thickness of the HTL ranges from about 20 to about 60 nm. When the thickness of the HTL is within these ranges, the HTL has excellent hole transporting abilities and excellent driving voltage properties.

Next, the emissive layer (EML) can be formed on the HTL by vacuum deposition, spin coating, casting, LB, or the like. When the EML is formed by vacuum deposition or spin coating, the deposition and coating conditions are similar to those used for the formation of the HIL, although the deposition and coating conditions may vary according to the material that is used to form the EML. Here, the EML can include an organic metal complex represented by Formula 1 described above, and can further include a phosphorescent dopant and/or additional host, as described above.

The amount of the phosphorescent dopant may range from about 0.1 to about 20 parts by weight based on 100 parts by weight of an emissive layer forming material (that is, 100 parts by weight is the total weight of the organic metal complex, which is a host, and the phosphorescent dopant). In one embodiment for example, the amount of phosphorescent dopant ranges from about 0.5 to about 15 parts by weight. When the amount of the phosphorescent dopant is greater than about 0.1 parts by weight, the effect of the addition of the dopant can be obtained. When the amount of the phosphorescent dopant is less than about 20 parts by weight, concentration quenching can be prevented.

The thickness of the EML may range from about 10 to about 60 nm. In one embodiment, for example, the thickness ranges from about 15 to about 50 nm. When the thickness of the EML is within these ranges, excellent lifetime and driving voltage properties can be obtained.

Next, the electron transport layer (ETL) can be formed on the EML by vacuum deposition, spin coating, casting, LB, or the like. When the ETL is formed by vacuum deposition or spin coating, the deposition and coating conditions are, in general, similar to those used for the formation of the HIL, although the deposition and coating conditions may vary according to the material that is used to form the ETL. One nonlimiting examples of a suitable material for the ETL includes tris(8-quinolinorate)aluminum ($Alq_3$).

The thickness of the ETL may range from about 10 to about 40 nm. In one embodiment, for example, the thickness ranges from about 25 to about 35 nm. When the thickness of the ETL is greater than about 10 nm, an excellent charge imbalance due to proper electron transporting speed can be obtained. In addition, when the thickness of the ETL is less than about 40 nm, an excellent driving voltage of the organic light emitting diode may be obtained.

Next, the electron injection layer (EIL) can be formed on the ETL by vacuum deposition, spin coating, casting, LB, or the like. When the EIL is formed by vacuum deposition or spin coating, the deposition and coating conditions are, in general, similar to those used for the formation of the ETL, although the deposition and coating conditions may vary according to the material that is used to form the EIL.

Nonlimiting examples of suitable materials for the EIL include $BaF_2$, LiF, NaCl, CsF, $Li_2O$, BaO, Liq and the like.

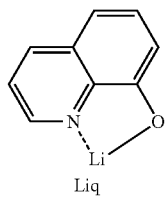

Liq

The thickness of the EIL may range from about 0.2 to about 1 nm. In one embodiment, for example, the thickness ranges from about 0.2 to about 0.5 nm. When the thickness of the EIL is within these ranges, excellent electron injecting abilities and driving voltages can be obtained.

Finally, the second electrode can be formed by depositing a material for forming the second electrode on the EIL to complete the organic light emitting diode according to one embodiment of the present invention.

The material for forming the second electrode may be a highly conductive transparent metal oxide such as ITO, IZO, $SnO_2$, ZnO or the like. Alternatively, the second electrode may be a transparent electrode, a reflective electrode or the like that is formed as a thin film. Nonlimiting examples of suitable materials for the thin film include Li, Mg, Al, Al—Li, Ca, Mg—In, Mg—Ag, Ca—Al and the like.

The first and second electrodes may act as an anode and a cathode.

Although an organic light emitting diode according to one embodiment of the present invention and a method of manufacturing the same have been described with reference to the structure illustrated in FIG. 4, it is understood that the structure of the organic light emitting diode according to the present invention is not limited to that illustrated in FIG. 4.

The organic light emitting diodes according to the present invention can be used in various types of flat display devices, for example, passive matrix organic light emitting devices and active matrix organic light emitting devices. In particular, when the organic light emitting diodes are used in passive matrix organic light emitting devices, the first electrode can be electrically connected to a source electrode or drain electrode of a thin film transistor in the organic light emitting device.

EXAMPLES

The present invention will now be described with reference to the following examples. However, it is understood that the following examples are presented for illustrative purposes only and are not intended to limit the scope of the invention.

Example 1

A substrate having a thickness of 100 nm (Aluminium and ITO)(manufactured by SDI) as an anode was cut to a size of 50 mm×50 mm×0.7 mm and was ultrasonically washed in isopropyl alcohol and pure water, respectively, for 5 minutes, and then washed with UV and ozone for 30 minutes.

A hole injection layer having a thickness of 60 nm was formed on the anode using m-TDATA as a hole injecting material. Then, NPB as a hole transporting material was deposited on the hole injection layer to form a hole transport layer having a thickness of 20 nm.

92 parts by weight of the organic metal complex represented by Formula 4 as a host and 8 parts by weight of Ir(piq)$_2$acac as a phosphorescent dopant were deposited on the hole transport layer to form an emissive layer having a thickness of 30 nm. Then, Alq3 having a thickness of 30 nm was formed on the emissive layer to form an electron transport layer. Liq was deposited on the electron transport layer to form an electron injection layer having a thickness of 0.5 nm. Then, MgAg having a thickness of 150 nm was formed as a cathode to complete the manufacture of an organic light emitting diode.

Example 2

An organic light emitting diode was manufactured as in Example 1, except that the emissive layer included 50 parts by weight of the organic metal complex represented by Formula 4 as a first host, 50 parts by weight of CBP as a second host and 8 parts by weight of Ir(piq)$_2$acac as a phosphorescent dopant.

Comparative Example

An organic light emitting diode was manufactured as in Example 1, except that the emissive layer included 92 parts by weight of CBP as a host and 8 parts by weight of Ir(piq)$_2$acac as a phosphorescent dopant.

Evaluation Results

Current density, efficiency and lifetime of the organic light emitting diodes of Examples 1 and 2 and the organic light emitting diode of the Comparative Example were evaluated using a PR650 (Spectroscan) Source Measurement Unit and McScience Polaronix M6000. The results are shown in FIGS. 5, 6 and 7, respectively.

Figure 5:
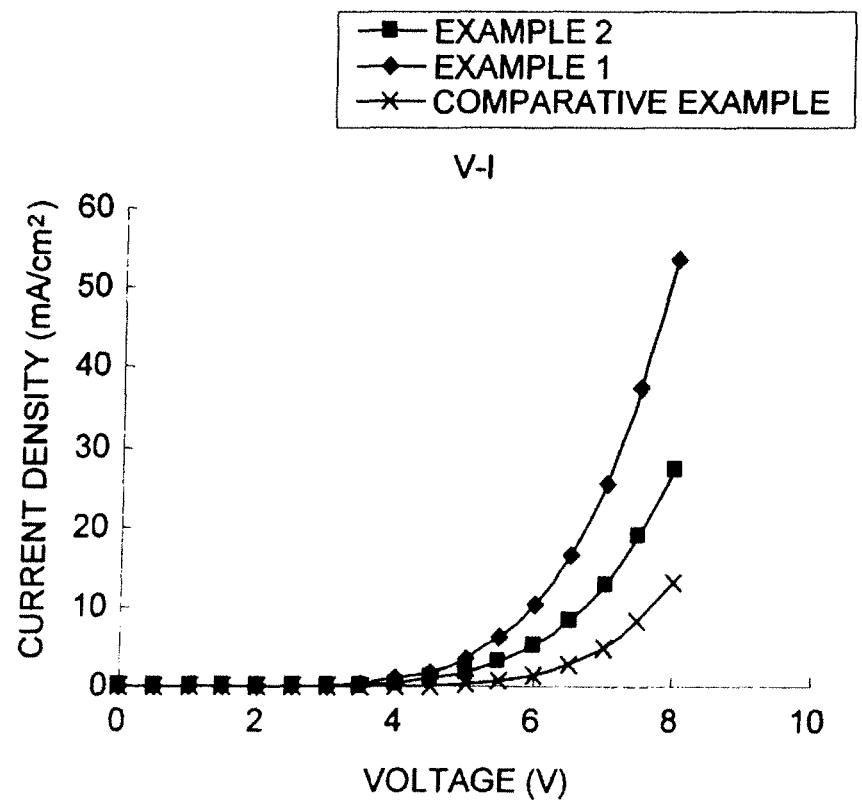
FIG. 5 is a graph comparing the voltages with respect to current density of organic light emitting diodes prepared according to Examples 1 and 2 and the Comparative Example.

Referring to FIG. 5, it can be seen that the organic light emitting diodes of Examples 1 and 2 according to the present invention have higher current density (mA/cm$^2$) as compared to the organic light emitting diode of Comparative Example.

Figure 6:
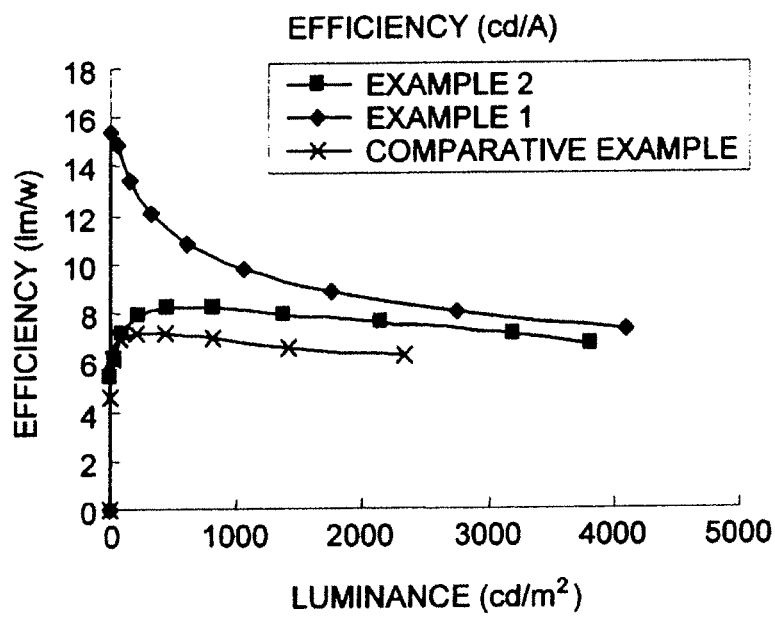
FIG. 6 is a graph comparing the luminance with respect to efficiency of organic light emitting diodes prepared according to Examples 1 and 2 and the Comparative Example.

Referring to FIG. 6, it can be seen that the organic light emitting diodes of Examples 1 and 2 according to the present invention have higher efficiency compared to the organic light emitting diode of the Comparative Example.

Figure 7:
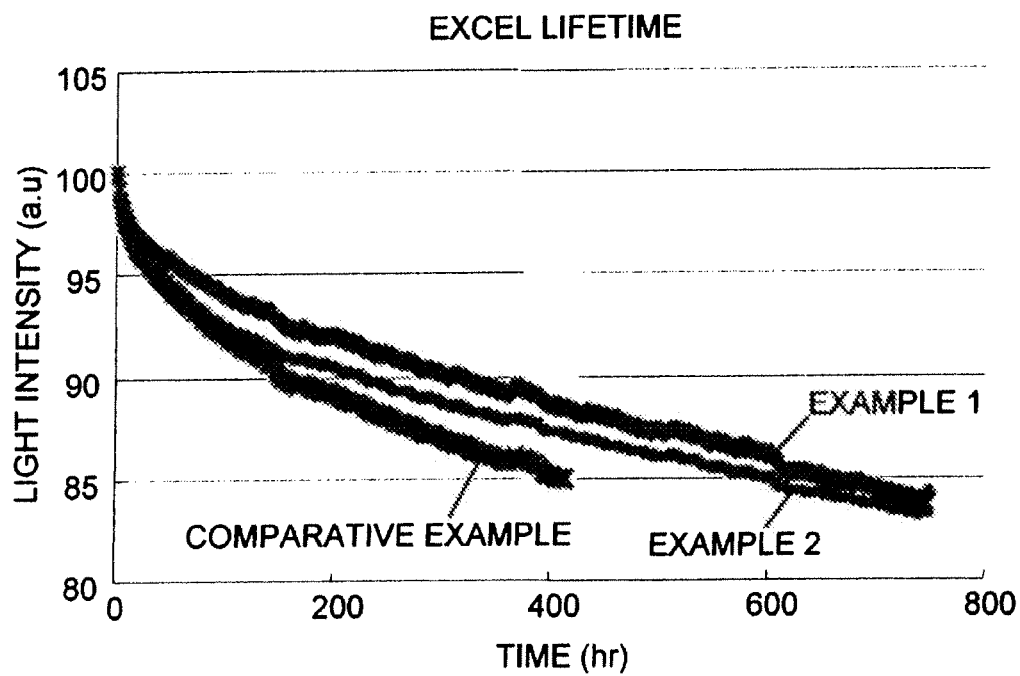
FIG. 7 is a graph comparing the lifetimes of organic light emitting diodes prepared according to Examples 1 and 2 and the Comparative Example.

Referring to FIG. 7, it can be seen that the organic light emitting diodes of Examples 1 and 2 according to the present invention have longer lifetimes compared to the organic light emitting diode of the Comparative Example.

Figure 8:
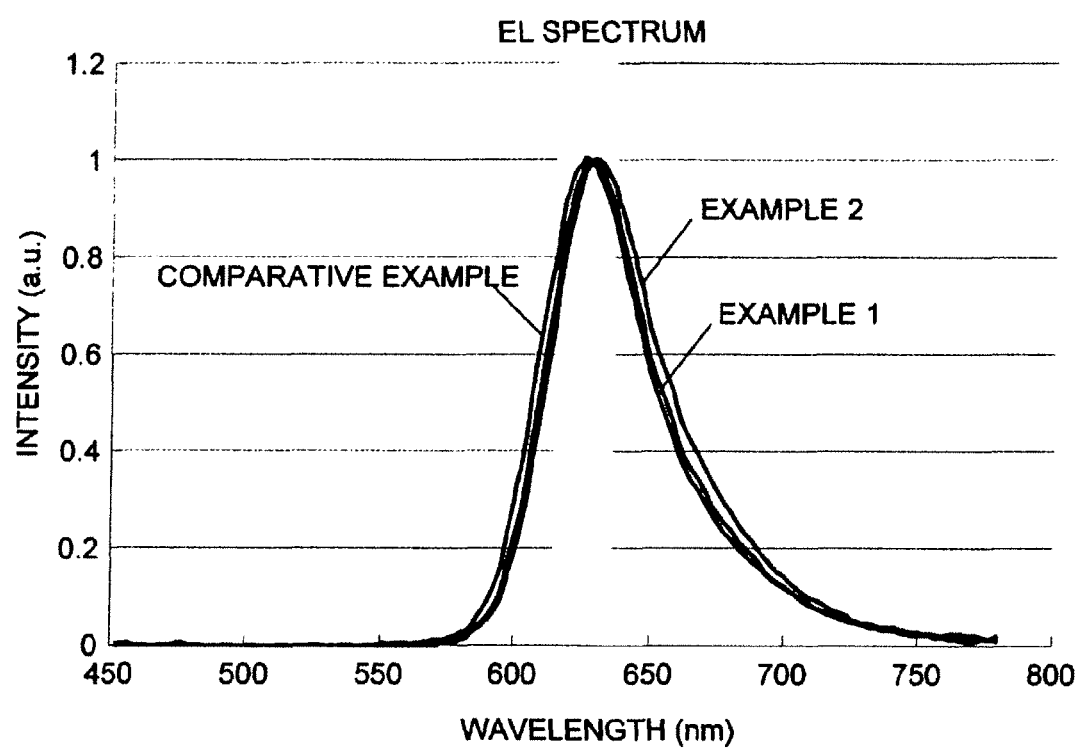
FIG. 8 is a graph comparing the Electroluminescence (EL) spectra of organic light emitting diodes prepared according to Examples 1 and 2 and the Comparative Example.

Electroluminescence (EL) spectra of the organic light emitting diodes of Examples 1 and 2 and the organic light emitting diode of Comparative Example were evaluated using a Spectra Radiometer (PR650, Photo Researcher Inc.) (measured at 5 V), and the results are shown in FIG. 8. Referring to FIG. 8, it can be seen that the organic light emitting diodes of Examples 1 and 2 and the organic light emitting diode of Comparative Example exhibit red emission where a maximum emission peak is observed at about 630 nm.

Example 3

An organic light emitting diode was manufactured as in Example 1, except that the emissive layer included 92 parts by weight of the organic metal complex represented by Formula 4 as a host and 8 parts by weight of the organic metal complex represented by Formula 14 as a phosphorescent dopant.

Example 4

An organic light emitting diode was manufactured as in Example 1, except that the emissive layer included 90 parts by weight of the organic metal complex represented by Formula 4 as a host and 10 parts by weight of the organic metal complex represented by Formula 14 as a phosphorescent dopant.

Evaluation

Efficiency, current density and lifetime of the organic light emitting diodes of Examples 3 and 4 were evaluated using a PR650 (Spectroscan) Source Measurement Unit and McScience Polaronix M6000. The results are shown in FIGS. 9, 10 and 11, respectively.

Figure 9:
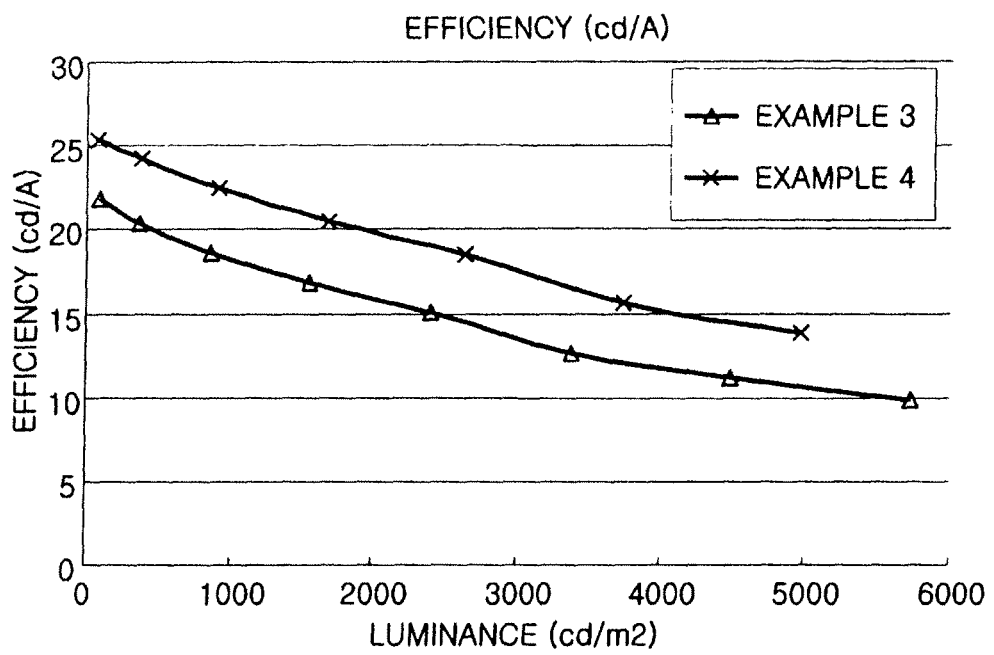
FIG. 9 is a graph of the efficiencies of organic light emitting diodes prepared according to Examples 3 and 4.

Referring to FIG. 9, it can be seen that the organic light emitting diodes of Examples 3 and 4 all have high efficiencies.

Figure 10:
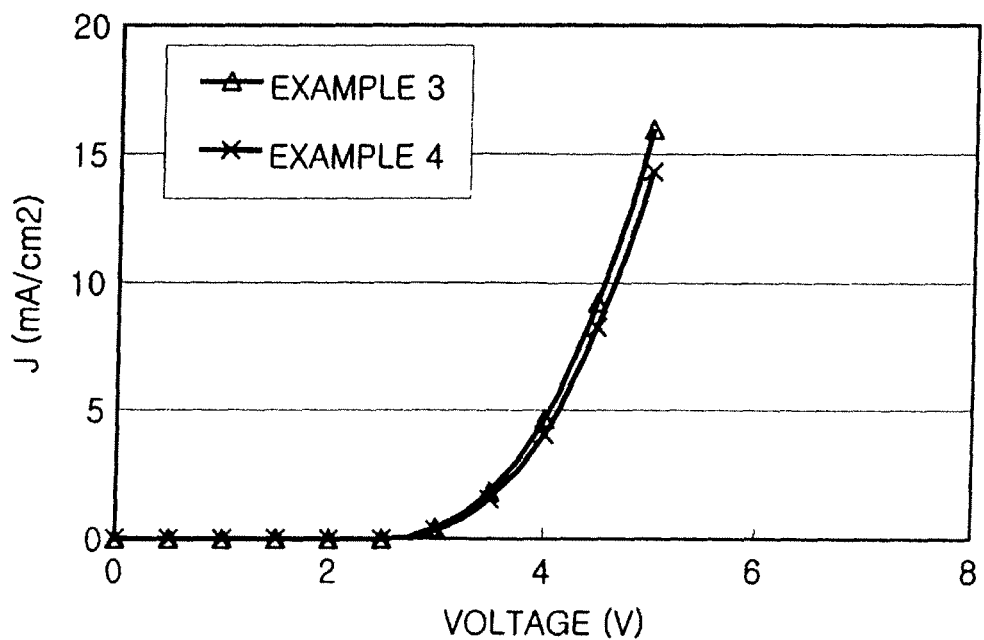
FIG. 10 is a graph of the current densities with respect to voltage of organic light emitting diodes prepared according to Examples 3 and 4.

Referring to FIG. 10, it can be seen that the organic light emitting diodes of Examples 3 and 4 all have high current densities (mA/cm$^2$).

Figure 11:
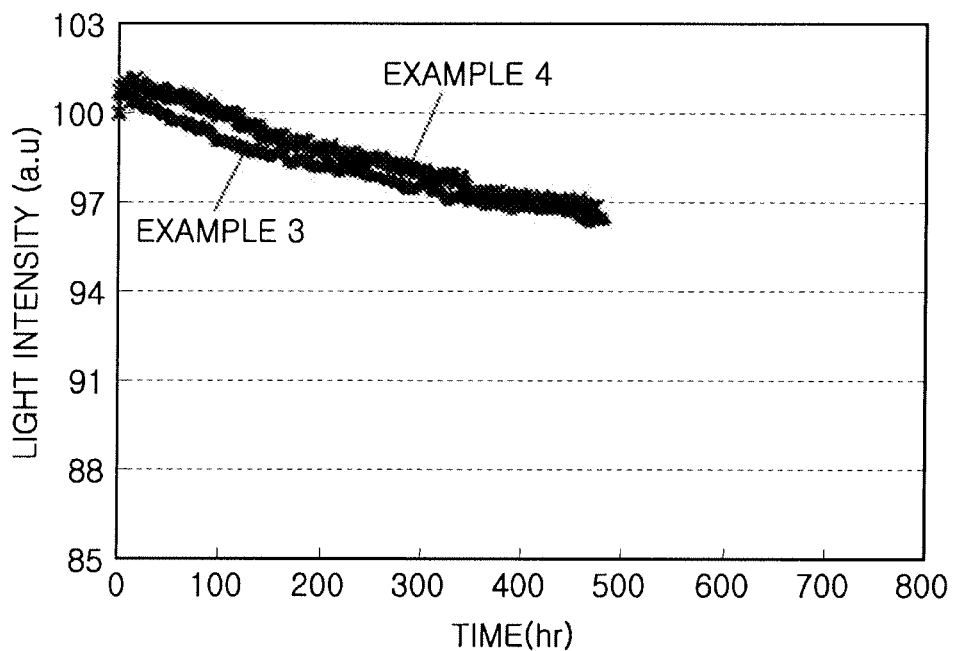
FIG. 11 is a graph of the lifetimes of organic light emitting diodes prepared according to Examples 3 and 4.

Referring to FIG. 11, it can be seen that the organic light emitting diodes of Examples 3 and 4 all have long lifetimes.

Figure 12:
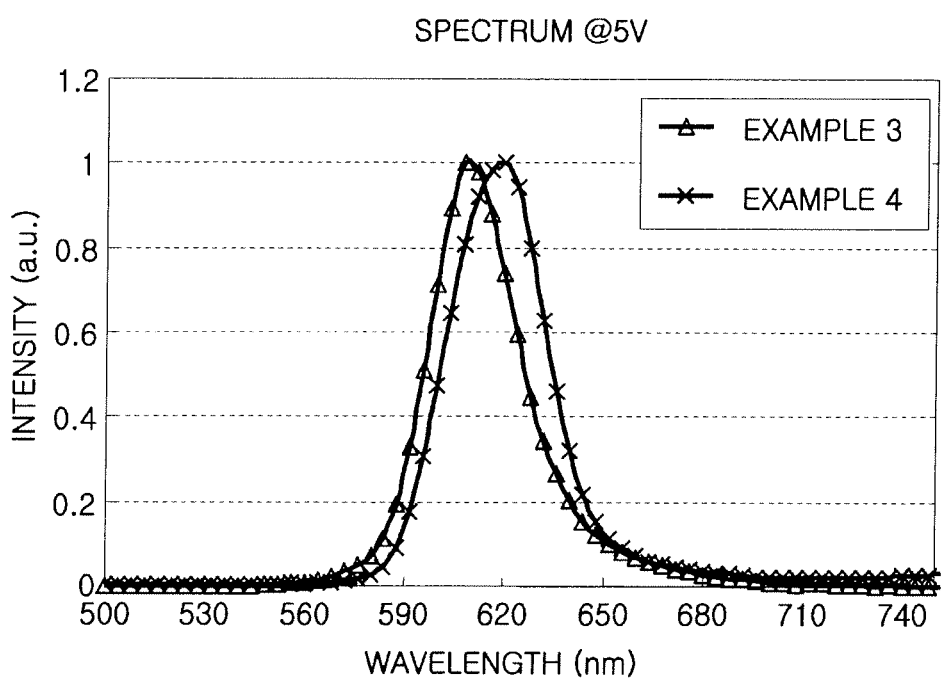
FIG. 12 is a graph of the Electroluminescence (EL) spectra of organic light emitting diodes prepared according to Examples 3 and 4.

EL spectra of the organic light emitting diodes of Examples 3 and 4 were evaluated using a Spectra Radiometer (PR650, Photo Researcher Inc.) (measured at 5 V), and the results are shown in FIG. 12. Referring to FIG. 12, it can be seen that the organic light emitting diodes of Examples 3 and 4 exhibit red emission where a maximum emission peak is observed at about 630 nm.

The oligomer-type organic metal complexes according to the present invention can be used as a phosphorescent dopant or as a host. Organic light emitting diodes employing the oligomer-type organic metal complexes according to the present invention have high current density, good luminescence, high current efficiency, long lifetime and the like.

While the present invention has been illustrated and described with reference to certain exemplary embodiments, it will be understood by those of ordinary skill in the art that various changes in form and details may be made to the described embodiments without departing from the spirit and scope of the present invention as defined by the following claims.

What is claimed is:
1. An organic light emitting diode comprising:
a first electrode;
a second electrode; and
an organic layer positioned between the first and second electrodes, wherein the organic layer comprises a host and a phosphorescent dopant, the host comprising an organic metal complex represented by Formula 1:

   Formula (1)

wherein M is a metal that can be five-coordinated or six-coordinated with the Ls, a is an integer ranging from 2 to 4, and each L is an anionic ligand independently selected from the group consisting of ligands represented by Formulae 2 and 3:

Formula (2)

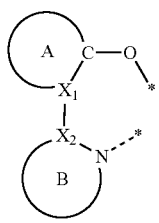

Formula (3)

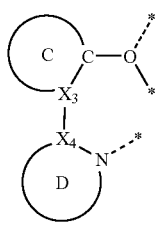

wherein each of A, B, C and D is independently selected from the group consisting of aromatic rings having from 5 to 20 ring members, and heteroaromatic rings having from 5 to 20 ring members, wherein each of $X_1$, $X_2$, $X_3$ and $X_4$ is independently selected from the group consisting of C, N, O, S or P, * is a site that binds M, A and B are bound to each other by a single bond, and C and D are bound to each other by a single bond.

2. The organic light emitting diode of claim 1, wherein M is selected from the group consisting of Zn, Ni, Co and Fe.

3. The organic light emitting diode of claim 1, wherein each of A, B, C and D is independently selected from the group consisting of benzene, pentalene, indene, naphthalene, azulene, heptalene, biphenylene, indacene, acenaphthylene, fluorene, phenalene, phenanthrene, anthracene, fluoranthene, triphenylene, pyrene, chrysene, naphthacene, picene, perylene, pentaphene, hecacene, pyrrole, imidazole, pyrazole, isothiazole, isoxazole, pyridine, pyrazine, pyrimidine, pyridazine, isoindole, indole, indazole, purine, quinoline, phthalazine, naphthyridine, quinoxaline, quinazoline, cinnoline, carbazole, phenanthridine, acridine, perimidine, phenanthroline, phenazine, phenothiazine, phenoxazine, benzothiazole, benzooxazole and benzoimidazole.

4. The organic light emitting diode of claim 1, wherein each of A and C is independently selected from the group consisting of benzene and naphthalene.

5. The organic light emitting diode of claim 1, wherein each of B and D is independently selected from the group consisting of pyridine, benzothiazole, benzooxazole, quinoline and benzoimidazole.

6. The organic light emitting diode of claim 1, wherein the organic metal complex represented by Formula 1 is selected from the group consisting of complexes represented by Formulae 4 and 5:

Formula (4)

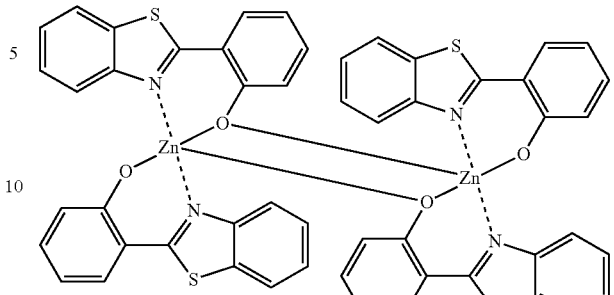

Formula (5)

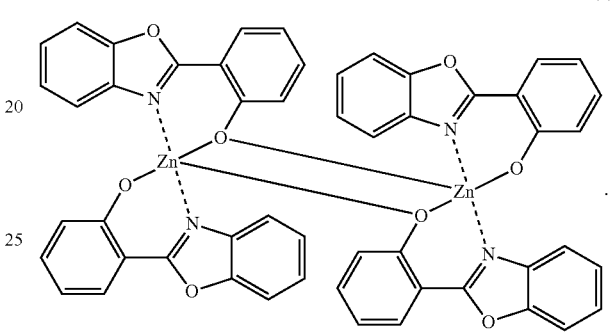

7. An organic light emitting diode comprising:
a first electrode;
a second electrode; and
an organic layer positioned between the first and second electrodes, wherein the organic layer comprises an emissive layer comprising a first host and a phosphorescent dopant, the first host comprising an organic metal complex represented by Formula 1:

$[M(L)_2]_a$      Formula (1)

wherein M is a metal that can be five-coordinated or six-coordinated with the Ls, a is an integer ranging from 2 to 4, and each L is an anionic ligand independently selected from the group consisting of ligands represented by Formulae 2 and 3:

Formula (2)

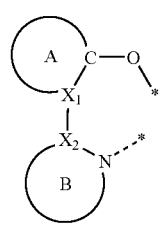

Formula (3)

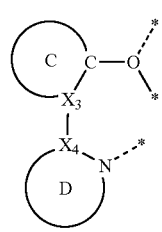

wherein each of A, B, C and D is independently selected from the group consisting of aromatic rings having from 5 to 20 ring members, and heteroaromatic rings having from 5 to 20 ring members, wherein each of $X_1$, $X_2$, $X_3$ and $X_4$ is independently selected from the group consisting of C, N, O, S or P, * is a site that binds M, A and B are bound to each other by a single bond, and C and D are bound to each other by a single bond.

8. The organic light emitting diode of claim 7, wherein the phosphorescent dopant comprises an organic metal complex comprising a metal selected from the group consisting of Ir, Pt, Os, Re, Ti, Zr and Hf.

9. The organic light emitting diode of claim 7, wherein the phosphorescent dopant comprises an organic metal complex comprising Ir.

10. The organic light emitting diode of claim 9, wherein the phosphorescent dopant is selected from the group consisting of bisthienylpyridine acetylacetonate Iridium, bis(benzothienylpyridine)acetylacetonate Iridium, bis(2-phenylbenzothiazole)acetylacetonate Iridium, bis(1-phenylisoquinoline) Iridium acetylacetonate, tris(1-phenylisoquinoline) Iridium, tris(phenylpyridine) Iridium, tris(2-biphenylpyridine) Iridium, tris(3-biphenylpyridine) Iridium, tris(4-biphenylpyridine) Iridium, Ir(pq)$_2$(acac) represented by Formula 8 where pq is 2-phenylquinoline and acac is acetylacetone, Ir(ppy)$_3$ represented by Formula 9 where ppy is phenyl pyridine, compounds represented by Formula 10, Firpic represented by Formula 11, Ir(piq)$_3$ represented by Formula 12, Ir(piq)$_2$acac represented by Formula 13 where piq is phenylisoquinoline, and combinations thereof:

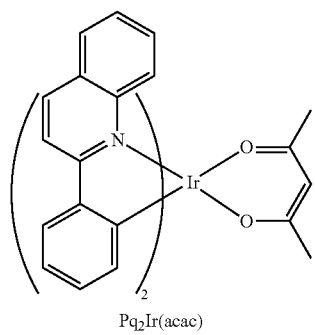

Pq$_2$Ir(acac)

Formula (8)

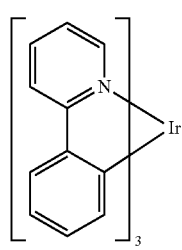

Formula (9)

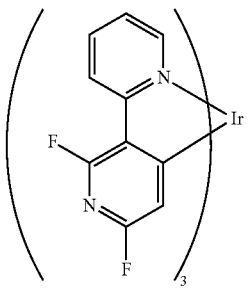

Formula (10)

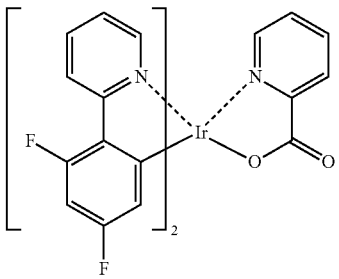

Formula (11)

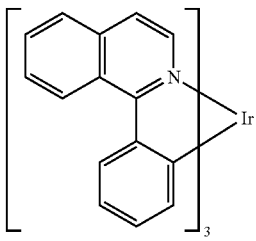

Formula (12)

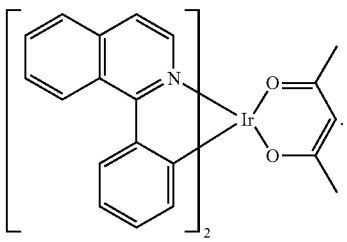

Formula (13)

11. The organic light emitting diode of claim 7, wherein the emissive layer further comprises at least one second host selected from the group consisting of CBP, Alq3, BAlq and Bebq.

12. The organic light emitting diode of claim 11, wherein the at least one host is present in an amount ranging from about 50 to about 150 parts by weight based on 100 parts by weight of the organic metal complex represented by Formula 1.

13. The organic light emitting diode of claim 7, wherein the organic layer further comprises at least one layer selected from the group consisting of a hole injection layer, a hole transport layer, an electron transport layer and an electron injection layer.

14. The organic light emitting diode of claim 7, wherein the phosphorescent dopant comprises an organic metal complex comprising Pt.

15. The organic light emitting diode of claim 14, wherein the phosphorescent dopant is selected from the group consisting of platinum(II)octaethylporphyrin (PtOEP), compounds represented by Formula 14, compounds represented by Formula 15, compounds represented by Formula 16, compounds represented by Formula 17, and combinations thereof Formula (14)
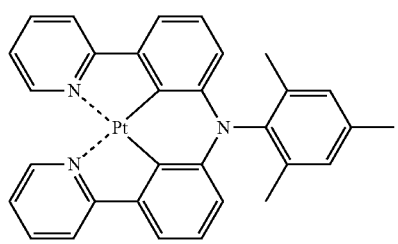
Formula (15)
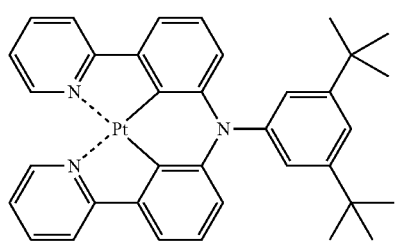
Formula (16)
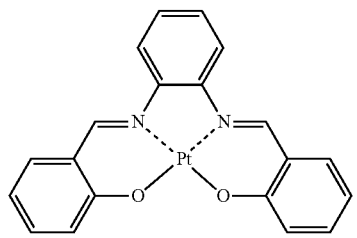
Formula (17)
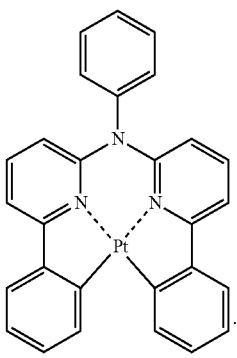
* * * * *